Sept. 22, 1942.                B. W. GAIR                2,296,607
INFUSION APPARATUS ESPECIALLY ADAPTED FOR BREWING COFFEE
Filed Dec. 14, 1940                2 Sheets-Sheet 1
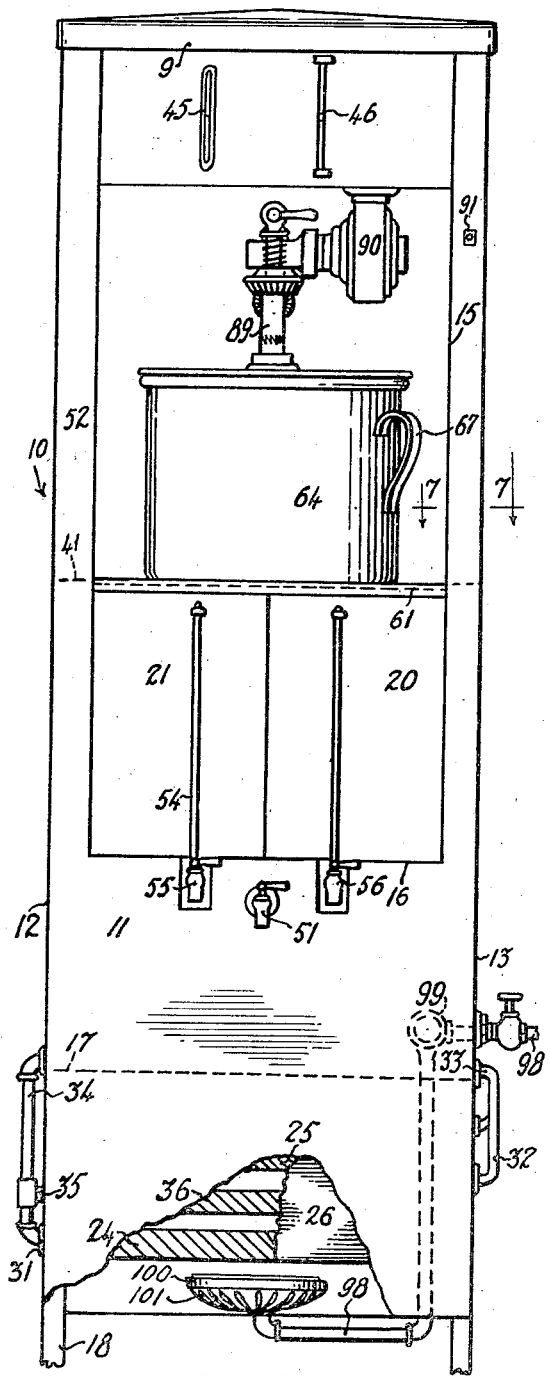
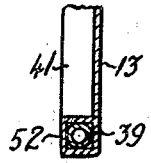
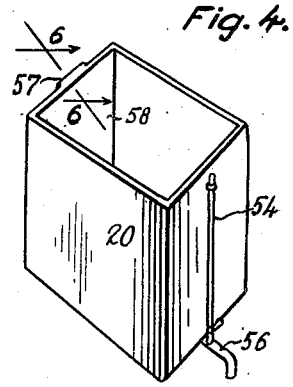
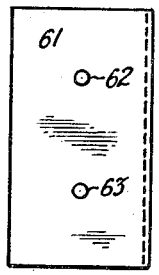
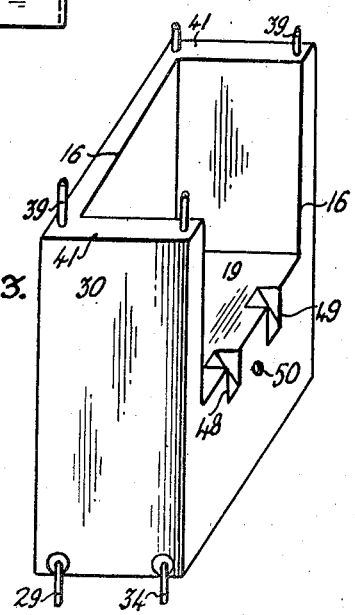
INVENTOR
BLAIR W. GAIR
BY
ATTORNEY Sept. 22, 1942.   B. W. GAIR   2,296,607
INFUSION APPARATUS ESPECIALLY ADAPTED FOR BREWING COFFEE
Filed Dec. 14, 1940   2 Sheets-Sheet 2
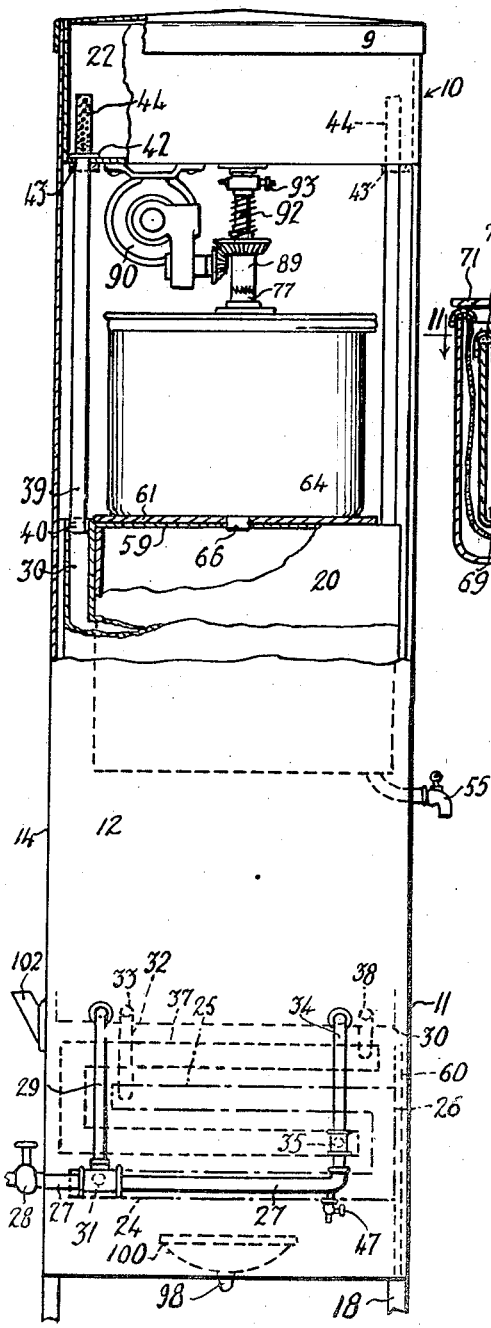
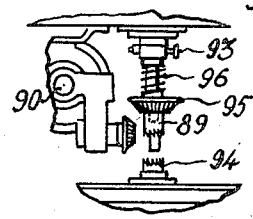
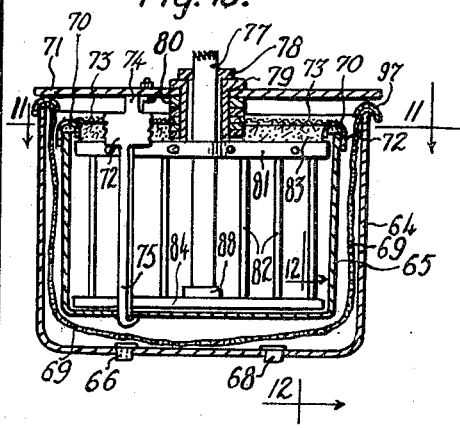
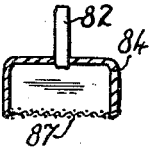
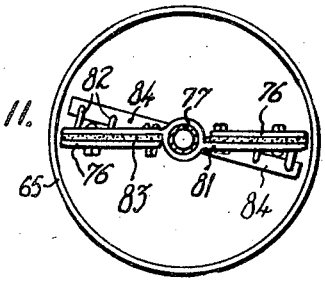
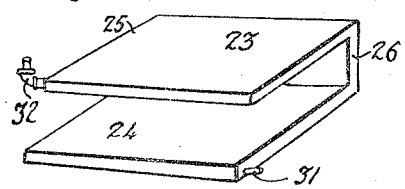
INVENTOR
BLAIR W. GAIR
BY
ATTORNEY

Patented Sept. 22, 1942

2,296,607

UNITED STATES PATENT OFFICE

2,296,607

INFUSION APPARATUS, ESPECIALLY ADAPTED FOR BREWING COFFEE

Blair W. Gair, Brooklyn, N. Y., assignor of thirty-three and one-third per cent to A. Jensenia Gair and thirty-three and one-third per cent to Estella H. Gair, both of Brooklyn, N. Y.

Continuation of application Serial No. 122,881, January 28, 1937. This application December 14, 1940, Serial No. 370,087

12 Claims. (Cl. 53—3)

The present invention relates to improvements in apparatus for making beverages from soluble substances and is herein particularly disclosed in the form of means for making infusions of coffee, although the invention is not thus limited.

Heretofore the making of coffee for drinking purposes has involved various steps with which considerable instrumentalities or parts such as those of the multiple container type, which necessarily assumed proportion of extended bulk, have been utilized, and combined objects of this invention are the provision of a compact easily assembled arrangement of parts, which latter involve novel featuring, with the result that advantage in the method or steps used also become a part thereof.

In the embodiment of the invention selected for disclosure one particular size or dimensions of a certain element, such as a water heating device, with other elements proportionate thereto, is illustrated. The device or assembly comprising these elements is such as to be suitable for use in restaurants or like places, although, in accordance with another of the objects of the invention, a device which may supply the beverage for a large number of persons may also supply the infusion for a relatively small number, such as found in the family, since yet another object concerned is the provision of an assembly of this character in which the coffee when prepared and properly ready for use, may thus remain for a prolonged period of time, with its original inherent, desirable flavor, appearance and aroma, as when a brew is not entirely immediately used.

Accordingly, on the principle of the illustrated means, the device is adapted for manufacture in a size with a capacity about the same as that of the so called coffee urn, batteries or multiples thereof, or it may be constructed in much larger dimensions than those shown.

In following the methodical steps of providing the brew, the capacity of the water heating means is such as to balance or cooperate with the capacity of a hot water reservoir or storage means. The latter is of such dimensions as to cooperate advantageously with the proportions of a hot water supply container or tank, and other features and advantages of these arrangements are herein disclosed.

Features of the invention of this application, which is a continuation of my abandoned application, Serial Number 122,881, filed Jan. 28, 1937, reside in structural arrangements whereby water delivered from the hot water supply container or tank, into a holder for ground coffee, is caused to flow upwardly, and in order to facilitate this upward flow, preventing any possibility of failure of action therein, cleaning means are provided, there being screen structures to control the grindings in the water and moving brushes cooperating with the screen means. In this manner, particles of grindings which are lighter than water are controlled with advantage, and the essences from the ground coffee are completely extracted. Any particles that are forced through the screen means and cover of the inner infusion container are caught in second filtering means in the infusion container thereby taking out all sediment and making a very clear extraction.

The compact unit illustrated includes dispensing means, although other features reside in removable dispensing containers as well as in a particular manner of housing these containers. The latter are separately fitted into a receptacle portion of the hot water tank, and it is still another structural feature of advantage that the infusion container may be caused to discharge into a selected member of plural dispensers.

According to the illustrated embodiment of the invention a stirring device with its brushes are revolved at the required rate by an electric motor having control means. The heating energy herein described is that of fuel gas, and water is supplied under the usual available pressure.

In practice, certain features of advantage have been incorporated in the gas heating device, as to the extent that with novel burner structure a very high rate of efficiency has been developed. Thermostatic control means are used, as presently further referred to and motor control means include both rheostat and suitable switch means. The speed of revolution of the motor is accordingly controlled, as well as its starting and stopping, as before disconnecting a drive shaft, for the purpose of adjusting, the infusion container or for recharging it with fresh ground coffee.

Hot water received in the supply tank from the storage reservoir is available under thermostatic control without loss of temperature, as for making an immediate run of coffee. When cold water, to replace water that has traveled or been used, as just stated, reaches the heating apparatus, the thermostatic means become active to release the fuel gas. During this time hot water is still available in the water supply tank and reservoir, and when the water again becomes fully heated in said apparatus, such as on some occasions, no upward run is caused thereon, the thermostat again becoming active to shut off the gas, so that a continuous and controlled flow of water at the required temperature is always assured.

With the above indicated objects and advantages in view, and others which will hereinafter appear, the invention resides in certain novel constructions and arrangements of parts the essential features of which are hereinafter clearly described, and fully illustrated in the accompanying drawings, in which:

Fig. 1 is a front elevational view of an apparatus for making infusions of coffee in accordance with the present invention;

Fig. 2 is a side view thereof on a slightly reduced scale and largely in vertical section;

Fig. 3 is a view in perspective of a liquid containing reservoir;

Fig. 4 is a view in perspective of a dispensing container;

Fig. 5 is a plan view on a reduced scale of a platform member;

Fig. 6 is a section on the line 6—6 of Fig. 4;

Fig. 7 is a section on the line 7—7 of Fig. 1;

Fig. 8 is a view in perspective of a liquid heating member;

Fig. 9 is a fragmentary view, similar to part of Fig. 2, but showing different positions of parts;

Fig. 10 is a central vertical section of a compound infusion chamber and filtering means;

Fig. 11 is a partial section on the line 11—11 of Fig. 10; and

Fig. 12 is a section on the line 12—12 of Fig. 10.

As shown in said drawings, the apparatus includes a housing 10 of polished sheet metal exterior finish having a front wall 11, side walls 12, 13, and a back wall 14.

The housing 10 is provided with a relatively large front opening 15, the lower part of which corresponds with a front opening or recess 16 in the aforesaid liquid reservoir, the latter being within the built up apparatus, and having its bottom part supported on bars or a horizontal frame 17 within the housing. Extending from the lower portion or base of the housing 10 are four legs or supporting members 18, each alike, of the required length, and having feet, not shown.

Removably seated on a bench 19 of the recess 16 of the reservoir, within the housing 10 is a coffee container and dispenser 20, and a second dispenser 21, like the first. The apparatus includes a top hot water tank 22 and in the lower part of the housing are water heating appliances which include hollow pans one of which 23 is shown in Fig. 8.

The pan 23 has a lower hollow plate 24, an upper hollow plate 25, and a hollow connecting web 26, so that water may move or circulate freely therein.

Assembled within the lower part of housing 10, in clasping relation with the pan 23, is a second water heating pan, and the arrangement includes a water supply pipe 27, on which is a shutoff valve 28. The line 27 having a circulating branch 29 leading to the reservoir 30, delivers water as at a connection 31 (Figs. 1 and 2) into the lower plate or arm 24, from which as when water is heated therein, the flow continues through the web 26 and arm 25, the latter having an outlet 32 therefrom and the outlet 32 in turn delivers the liquid flow, at its upper end connection 33, into the reservoir 30.

The connection or inlet tube at 31, for example, is fitted tight, being braized into the heater arm 24. The connection 33 is similarly tightly made, as in the case of all other connections herein. In some cases the connections may be made by press fitting or the equivalent, and in some places herein, watertight fittings are shown in the form of threaded nipples, with nuts, in some instances lock nuts, and in some cases gaskets are used.

At a circulating branch 34, the line 27 has a delivery 35 into a lower arm 36 of the second compound heating pan, the latter having an upper arm 37, from which a delivery branch pipe 38 communicates internally with the reservoir 30.

Rising from the top of the reservoir 30 and in internal communication therewith are four pipes 39, there being one pipe at each corner thereof, and these pipes communicate internally with the top tank 22. A lower connection 40, as already indicated, of a pipe 39 is seen, Fig. 2, at a ledge portion 41 of the reservoir, and at the upper threaded end of the pipes 39, a lock nut 43 is used.

The upper threaded ends of the pipes 39 terminate within the tank 22, as in a threaded nipple 44 having perforations therein. The nipple 44, which threadedly, tightly fits over the pipe 39, and a gasket 42 is provided thereat. Other locknuts, as at 43, are used in the sealing connection. The nipples 44 are closed or provided with plugs at their top ends, so that as heated water rises from the heating pans and reservoir, water circulation is aided and caused by virtue of said perforations. To further aid in water circulation, a pipe 39 may have its lower end extended downwardly considerably into the reservoir 30, and on the tank 22 are provided a thermometer 45 and water gauge 46.

A drain cock 47 is provided in the water circulating system, and in the reservoir 30, which also has therein two recesses 48, 49, is an opening 50. The opening 50 has secured therein a faucet 51, through which hot water may be drawn off.

The outer sheeting 11 of the front wall of the housing registers, at a top portion thereof, with the bench surface of the reservoir 30, and in said sheet portion are indentations which register with the front boundaries of the recesses 48, 49.

Between their opposite ends, the pipes 39 are incased in sheeting portions 52 of the rectangular cross-section, and these portions 52 are in effect continuation of the front and side wall outer coverings thereat. Joints or seams, as between a portion 52 and its body portion 11 therebelow are of braized or soldered type, and the complete outer covering presents as at these parts an unbroken and neat appearance.

The coffee containers or dispensers 20, 21, fit snugly into the recess 16, and the liquids therein, as a feature of advantage is kept hot or at an equitable temperature by the embracing reservoir structures. Gauges 54 are provided on the containers 20, 21, and faucets 55, 56, at lowermost parts thereof extend into the recesses 48, 49. The faucet stems, as seen in Fig. 2, at first depend slightly at their bases from the containers, and it is another feature of the arrangement that said stems are reinforced for strength so as to provide hand grip portions.

As seen in Figs. 6 and 7, a back wall 58 of a container has thereon a lip 57, and the container has on its top a cover 59. The cover 59 has a back rim 53 curled under slightly, which, when the cover is closed, latches around the curled rim 57, of the dispenser 20, and therefore, when a user grasps a handle 85 and the aforesaid elongate stem of the faucet 56, the container is manipulable in a secure manner.

Transversely of the cover 59 is said handle 85, two depending portions of which, as shown, pass through apertures 86 in said cover, but one of the apertures and depending portions being seen in the drawings, and there being a transverse indentation in said cover, in which the handle rests when not in use. The handle 85 is shown in dot-and-dash lines in an upper or working position at which time the illustrated nut acts as stopping means.

The covers 59 are used in the assembly below a platform 61. Apertures in the covers correspond with and like apertures 62, 63, presently referred to.

On the tops of the containers 20, 21, rests the platform 61, in which are apertures 62, 63, and on the platform 61 is an outer member or liquid holder 64 of filtering and infusion apparatus in which is also an inner holder or chamber member 65. The member 64 has on the bottom thereof an eccentric discharge nipple 66, which enters an aperture 62 or 63 for discharging infusion into a dispenser.

On the member 64 is also a handle 67, and opposite the drain nipple 66 may be a plug 68 for entering the other aperture 63 or 62. In this way, filtered coffee is guided into a selected dispenser, the outer container being turnable into a predetermined position.

Within the outer member 64 is a cloth or fabric filtering bag or element 69, which suspends from a ring 97 for clamping the filtering bag over the rim of the member 64.

Fitting onto the inner container or jug 65, is a cover which includes a ring band 72 and in an inturned top portion of said band, which forms an annular hollow, is a gasket 70, which sealingly engages the top edge part of the member 65, and braized or soldered on the convex side of the hollow inturned flange portion of the ring band 72 is the outer margin of a filtering member or disc 73 of close mesh.

From the ring band 72 extend upwardly four brackets one of which 74 is shown. The brackets 74 are bolted to the under side of the cover 71, holding the ring band 72 thereto. From the ring band 72, opposite each other, extend two clamping spring fingers 75, one of which, with its end catch, is also shown, and these fingers therefore releasably embrace the inner filtering jar 65 at the bottom thereof, holding it firmly to the gasket in the ring band 72.

As a unit, the outer cover 71, and the inner holder 64, are assembled and then the inner holder, as above indicated, is detachable from the elements 75.

On a hollow shaft having a section 77 is fastened a collar 78 (Fig. 10), and embraced between nuts 79, 80, is said cover 71, at its center. The nut 79 forms part of a depending bushing, which is free on the shaft section 77, and gripping the mesh disc 73 at a central aperture thereof are two other nuts as shown.

Fast on the shaft part 77 and revolvable therewith, relative to the containers with their covers is a cleaning and stirring assembly which includes, viewing also Fig. 11, a cross bar 81. The bar 81 is split centrally where it is attached to the shaft, and descending from the cross bar and held at their upper ends thereto are six like rods 82. Bars 76, one on each side, (see Fig. 11) are bolted to the bar 81 and hold the cleaning brushes 83, in two segments, which brushingly engage the mesh disc 73 to continuously remove therefrom particles of ground coffee, during the revolution.

The rods 82, as seen also in Fig. 11, are metallically held fast, and slightly inclined at their lower ends, in a sheet metal channel member 84, slightly oblique to the bar 81. Entirely around the channel 84 at its lower part is braized and sealingly held the boundary margin of a gauze or close mesh member 87. At a collar 88, the shaft 77 is fast with the channel 84.

Means for revolving the shaft 77, having the coacting part 89, and there being an interposed clutch means, as shown, include an electric motor 90 in the circuit wiring of which is a switch 91, and a rheostat of usual construction. The shaft 89 carries a bevel gear 95 and a motor shaft pinion has teeth of such number, meshing with the gear, as to reduce the revolutions of the shaft 89, 77 to the required R. P. M.

From the tank 22 which has a cover 9, extends downwardly a discharge pipe 92, on which is a control valve 93, and a part of this arrangement is a tooth clutch 94, elements of which are found on the shaft sections 77, 89, rendering said sections separable, as shown in Fig. 9. The shaft section 89, with its gear thereon, is manually slidable on the relatively fixed pipe 92 against the action of a coil spring 96, and as the space between the clutch elements, when moved apart, enables release of the chamber member 64, the latter is freely movable into and out of its position on the platform 61 within the housing.

Making the separable connection at the clutch 94 properly tight, when the clutch elements are meshed, a stub section of the pipe 92 descends from the shaft section 89 (see Fig. 9) and is fast therewith, this stub section being separable from the pipe proper 92. It is noted that a collar of the section 89 above the gear 95 revolves reliably within the lower end of the coil spring 96. Heated water or liquid descending through the pipe 92 and hollow shaft 77 is discharged through the mesh element 87 of the channel member 84, and this element 87 is effective to prevent any tendency of backward or upward movement of particles of grindings or the like through the pipe 77. On being discharged through the screen 87, water movement, through the ground coffee, and with its essence, is upward in the container 65, past the rotating brushes 83, and then downward through the fabric screen 69 and discharge nipple 66 into dispensing container 20 or 21.

A fuel gas supply line is shown at 98 with a control valve thereon and with this line is a thermostat connection 99. The line 98 has thereon a gas burner 100 below the nested heating plates, and extending to the burner 100 is a line branch not shown having a pilot light terminal. The gas line and burner 100 have usual air mixing features, as well as a dished sheet metal lower shield 101, having radical slots therein, which form interposed pointed segments. With this shield arrangement, which really acts as a secondary air conditioner, it has been found the use of gas is highly economical; that is to say, while water is heated in the element 23, and all other elements, including the supply tank 22, the amount of gas consumed is very low.

For clarity, the positions of the heating members which include said element 23 are shown in Fig. 2, in dot-and-dash lines, and in dash lines respectively. The plates of the heating members, while clasped in the stated way, are spaced apart to accommodate flame from the burner 100 and form the back wall 14 of the housing extends an exhaust or flue, a portion 102 of which is shown.

On placing a thermometer in the flue 102, the aforesaid description of high gas efficiency is well supported and the readings on the thermometer while the device is in operation is much lower than the temperature of the water in the reservoir and other described portions of the system.

In practice, the heating appliances including the member 23 and associated heating member, and the reservoir 30 and container 22, have, between them and the walls 11, 12, 13, 14, asbestos, partly shown at 60, or other insulation for heat control.

With this description and the statements and showing herein the operation is disclosed. The hollow vertical fins of the reservoir 30, that is to say the side and back boundaries of the recess 16, taken also with the seat 19, embrace multiple flat sides of the containers 20, 21, with the stated advantage. When and if a single rectangular contained is used in the recess 16, flat surfaces of the reservoir 30 embrace four sides of such container while the latter is easily inserted and removed from its position. The apparatus can be used with any number of containers for dispensing coffee. In this way the containers can be filled and removed with the brewed coffee in them, and the brewed coffee is dispensed elsewhere without loss of aroma and flavor. During the operation, a setting of the thermostatic control which maintains the heat of the water in the reservoir 30 at a temperature of about 200° F. to 210° F. has been found satisfactory. At this heating level it has also been found that a temperature of about 170° F. to 180° F. of the coffee in the containers 20, 21, is also maintained.

Variations may be resorted to within the scope of the invention and parts of the improvements may be used without others.

I claim:

1. In a coffee making apparatus, in combination, a top hot water tank, a filtering chamber having an inner vessel with a strainer forming a cover, an outer vessel spaced from the first vessel and having also a cover, said covers having central apertures, the outer vessel having a bottom discharge opening, a pocket strainer disposed in the space between the vessels, means sealingly holding the top part of the pocket strainer between the top of the outer vessel and its cover, a rigid tube for hot water passing from the bottom of the tank through said apertures, said tube having its lower end disposed in the inner container, means sealingly holding said tube in the apertures, a cross tube fast on said lower end and having its under side open near the bottom of the inner vessel and a strainer having its margin fastened to the cross tube around its open side.

2. An apparatus for making infusions of coffee comprising in combination an upper hot water tank, a double walled filtering chamber including an inner grindings receiving vessel and an outer vessel spaced from the first vessel, a strainer forming a cover for the inner vessel, a cover for the outer vessel, a pocket filter between the vessels, the outer vessel having a bottom discharge opening, a tube passing from the tank through the covers and having its lower end open at the bottom of the inner vessel, whereby water may flow upwardly through the grindings and strainer and then downwardly through the filter, and revolvable brush means for cleaning the under side of the strainer.

3. In an apparatus for making infusion of coffee having an upper water supply tank, a double walled filtering chamber therebelow comprising an inner grindings holding vessel having a strainer forming a cover, an outer vessel spaced from the first vessel and having also a cover, a tube passing from the tank through the covers and having an ending near the bottom of the inner vessel so as to cause water to flow upwardly through the grindings and strainer, cleaning brushes engaging the under side of the strainer, means holding said brushes in revolvable relation on the tube, and means for revolving said holding means with their brushes.

4. In an apparatus for making infusions of coffee, in combination, an upper water supply tank, a double walled filtering chamber comprising an inner grindings holding vessel having a strainer forming a cover, an outer vessel spaced from the first vessel and having also a cover, a tube passing through the covers and having an ending within the inner vessel near its bottom so as to cause water to flow upwardly through the grindings and strainer, a revolvable hollow shaft on the tube, means sealingly gripping the covers and wherein the hollow shaft is revolvable; brushes engaging the under side of the strainer; and means carrying said brushes and fixedly held on said shaft below said sealing means.

5. An apparatus for making infusions and extractions comprising in combination an upper hot water tank, filtering means comprising an inner vessel for grindings, said vessel having a strainer forming a cover, an outer vessel spaced from the first vessel and having an outer cover, pipe means passed from the tank through the covers and having an ending within the inner vessel near its bottom so as to cause water to flow upwardly through the grindings and strainer, a revolvable hollow shaft on the pipe, means sealingly gripping the covers around the pipe and wherein the shaft is revolvable, brushes engaging the under side of the strainer, a frame on which said brushes are fixedly held to said shaft, and means for revolving said shaft with its mounting, said latter means including an electric motor.

6. An apparatus for making infusions of coffee comprising in combination water heating means and having an upper hot water supply tank, filtering means comprising an inner vessel for grindings, said vessel having a strainer forming a cover, an outer vessel spaced from the first vessel and having also a cover, pipe means passing from the tank through the covers and having a low ending within the inner vessel so that water may flow upwardly through the grindings and strainer, a bag filter having its top part held on the top of the outer vessel and disposed in the space, the outer vessel having a lower discharge opening, a hollow revolvable shaft on the pipe, means sealingly gripping the covers around the pipe and wherein the shaft is revolvable a stirring frame fast on the shaft and including spaced vertical rods in the inner container, brushes mounted on the frame and engaging the strainer, and means for revolving said shaft with its frame and the brushes thereon.

7. In an apparatus for making infusions of coffee, in combination, an upper hot water tank, filtering means including an inner grindings receiving vessel having a strainer forming a cover, an outer vessel having also a cover, a pipe leading from the tank and having a revolvable section passing through the covers into the inner vessel, means sealingly gripping the covers and wherein said section is revolvable, a frame rigid with said section within the inner vessel and having on the top thereof brushes for cleaning the under side of the strainer, a cross tube forming the lower part of the frame and having an open bottom, a strainer disposed across the open bottom of the tube so that as water flows through the pipe and upwardly through the grindings and first strainer, the second strainer may prevent upward movement of particles through the pipe, and means for revolving said section with its frame.

8. In an apparatus for making infusions of coffee comprising a grindings receiving vessel having a top strainer thereon, said strainer having a central bearing, a device having a hollow shaft revolvable in the bearing, a frame fast on the shaft and including a top cross unit having thereon brushes for cleaning the under side of the strainer, a bottom cross unit comprising a channel member having closed end and an open bottom, vertical spaced rods connecting said units, and another strainer disposed across the open bottom of said member.

9. In a coffee making apparatus having an elevated hot water supply means, a leaching receptacle including an outer container having a top cover and a bottom discharge opening, an inner grindings container spaced from the outer container and depending from said cover, a screen cover for the inner container, a flexible filtering element depending from the margin of the closed top and disposed in the space between the containers, a pipe passing from the supply means through both covers and having its discharge end near the bottom of the inner container, said pipe having a revolvable section, means mounted on said section for removing particles from the underside of the screen cover, said pipe having also a fixed portion, and water control means carried by said portion.

10. In a coffee making apparatus comprising in combination a housing, a filtering chamber including an inner vessel having vertical walls with a strainer thereon forming a top cover, an outer vessel spaced from the first vessel and having also vertical walls with a top cover thereon, said covers having central apertures therein, a flexible strainer forming a pocket around the inner vessel and having its top part held around the juncture of the outer vessel walls with their cover, the flexible strainer being disposed in the space, means projecting from the under side of the outer vessel cover and embracing the inner vessel, said means having a bushing in said apertures, and a hot water tube passed through the bore of the bushing, said tube having its discharge end disposed in spaced relation with the bottom of said inner vessel.

11. An apparatus for making infusions of coffee comprising in combination with upper hot water supply means, a double walled filtering chamber including an inner grindings receiving vessel, an outer vessel spaced from the first vessel, a strainer forming a cover for the inner vessel, a cover for the outer vessel, filtering means between said vessels, the outer vessel having a bottom discharge opening, a tube passing from the water supply means through the covers and having its lower end open at the bottom of the inner vessel, whereby water may flow upwardly through the grindings and strainer and then downwardly through said filtering means, and means for causing circular movement of the water during its upward movement below said strainer.

12. An apparatus for making infusions of coffee comprising in combination an upper hot water tank having a support therebelow, a filtering means disposed on said support and including an outer vessel, the latter having a bottom discharge opening, a cover for the outer vessel and having a central aperture, gripping means depending from the cover within the vessel, said filtering means having a grindings vessel disposed within the outer vessel and spaced therefrom, the inner vessel being held by said gripping means, a strainer disposed across the top of the inner vessel and having an aperture aligned with the aperture of said cover, and a water pipe passing from the tank through the aligned apertures and having a discharge end within the grindings vessel near the bottom thereof.

BLAIR W. GAIR.